(12) United States Patent
Korovin et al.

(10) Patent No.: US 9,128,768 B2
(45) Date of Patent: Sep. 8, 2015

(54) CLOUD BASED MASTER DATA MANAGEMENT

(75) Inventors: Ievgenii Korovin, Charlottenlund (DK); Alexander Malafeev, Frederiksberg (DK); Dennis Kukurudza, Lund (SE)

(73) Assignee: Microsoft Technology Licensing, LCC, Redmond, WA (US)

( * ) Notice: Subject to any disclaimer, the term of this patent is extended or adjusted under 35 U.S.C. 154(b) by 0 days.

(21) Appl. No.: 13/015,435

(22) Filed: Jan. 27, 2011

(65) Prior Publication Data

US 2012/0197968 A1      Aug. 2, 2012

(51) Int. Cl.
G06F 15/16   (2006.01)
G06F 9/50    (2006.01)
G06F 15/173  (2006.01)
G06F 9/44    (2006.01)

(52) U.S. Cl.
CPC ........... *G06F 9/5072* (2013.01); *G06F 15/16* (2013.01); *G06F 15/173* (2013.01)

(58) Field of Classification Search
CPC .............................. G06F 15/16; G06F 15/173
USPC .......... 709/203, 224; 710/110; 717/105, 107; 705/1.1, 7.27; 707/102
See application file for complete search history.

(56) References Cited

U.S. PATENT DOCUMENTS

| | | | |
|---|---|---|---|
| 6,167,408 A | 12/2000 | Cannon | |
| 6,519,568 B1 * | 2/2003 | Harvey et al. | 705/1.1 |
| 6,944,662 B2 | 9/2005 | Devine | |
| 7,213,037 B2 | 5/2007 | Rangadass | 1/1 |
| 7,437,440 B2 * | 10/2008 | Manion et al. | 709/223 |
| 7,509,326 B2 | 3/2009 | Krabel et al. | 1/1 |
| 7,546,335 B2 | 6/2009 | Moeller et al. | |
| 7,617,504 B1 | 11/2009 | Hill et al. | |
| 7,660,782 B2 | 2/2010 | Andrews | 709/999.002 |

(Continued)

FOREIGN PATENT DOCUMENTS

| | | |
|---|---|---|
| CN | 1825343 | 8/2006 |
| CN | 1838601 | 9/2006 |

(Continued)

OTHER PUBLICATIONS

"*Manage all your master data with one integrated solution*"; Feb. 2007; http://www.busmanagement.com/article/Manage-all-your-master-data-with-one-integrated-solution/; 3 pgs.

(Continued)

*Primary Examiner* — Helal A Algahaim
*Assistant Examiner* — Mahmoud Ismail
(74) *Attorney, Agent, or Firm* — Damon Rieth; Danielle Johnston-Holmes; Micky Minhas

(57) ABSTRACT

A cloud based service provides Master Data Management (MDM) services to clients. A client may create/modify MDM workflows that are hosted by the cloud based service to assist in meeting their needs. An interface is provided at points within the workflow that is hosted by the cloud based service. The cloud based service utilizes a flexible pipeline that executes predefined configurable blocks. A user can create or customize an existing workflow based on the predefined set of blocks (e.g. execution blocks, conditional blocks, loop blocks). The blocks are configured to receive, process and send information relating to the master data according to a predefined schema. Clients may publish master data changes and/or subscribe to master data changes made by other clients.

20 Claims, 6 Drawing Sheets

(56) References Cited

U.S. PATENT DOCUMENTS

| | | | |
|---|---|---|---|
| 7,676,601 B2 | 3/2010 | Smith | |
| 7,765,185 B2 | 7/2010 | Rangadass | 707/607 |
| 7,827,234 B2 | 11/2010 | Eisenberger et al. | |
| 7,853,961 B2 | 12/2010 | Nori et al. | |
| 7,953,699 B2 | 5/2011 | Mathur | |
| 7,970,823 B2 | 6/2011 | Moeller et al. | |
| 8,010,484 B2 | 8/2011 | Gernold | |
| 8,099,431 B2 | 1/2012 | Buchmann | |
| 8,131,672 B2 | 3/2012 | Hind et al. | |
| 8,180,732 B2 * | 5/2012 | Krabel et al. | 707/628 |
| 8,214,325 B2 | 7/2012 | Navas | |
| 8,285,681 B2 | 10/2012 | Prahlad | |
| 8,364,608 B2 | 1/2013 | Hammer et al. | |
| 8,364,715 B2 | 1/2013 | Schoknecht et al. | |
| 8,429,220 B2 | 4/2013 | Wilkinson et al. | |
| 8,463,743 B2 | 6/2013 | Gopal et al. | |
| 8,468,127 B2 | 6/2013 | Hind et al. | |
| 8,538,981 B2 | 9/2013 | Navas | |
| 8,606,723 B2 | 12/2013 | Seubert et al. | |
| 8,812,482 B1 | 8/2014 | Kapoor et al. | |
| 2002/0010807 A1 | 1/2002 | Multer et al. | |
| 2003/0069799 A1 | 4/2003 | Hoffman | |
| 2004/0054569 A1 | 3/2004 | Pombo et al. | |
| 2004/0103182 A1 | 5/2004 | Krabel | 709/223 |
| 2004/0133659 A1 | 7/2004 | Lacey et al. | |
| 2005/0004978 A1 | 1/2005 | Reed et al. | |
| 2005/0080801 A1 | 4/2005 | Kothandaraman | |
| 2006/0080257 A1 | 4/2006 | Vaughan et al. | 705/51 |
| 2006/0106859 A1 | 5/2006 | Eugene | |
| 2006/0112123 A1 | 5/2006 | Clark | |
| 2006/0149840 A1 | 7/2006 | Thompson | |
| 2006/0200797 A1 * | 9/2006 | Grasselt et al. | 717/107 |
| 2007/0156418 A1 | 7/2007 | Richter et al. | |
| 2008/0243902 A1 * | 10/2008 | Rong et al. | 707/102 |
| 2008/0244091 A1 | 10/2008 | Moore et al. | 709/246 |
| 2009/0158246 A1 * | 6/2009 | Sifter et al. | 717/105 |
| 2009/0171811 A1 | 7/2009 | Peter et al. | |
| 2009/0204588 A1 | 8/2009 | Hosono | |
| 2009/0228428 A1 | 9/2009 | Dan et al. | 1/1 |
| 2009/0287868 A1 * | 11/2009 | Lee | 710/110 |
| 2009/0327292 A1 | 12/2009 | Janssen | |
| 2010/0042641 A1 | 2/2010 | Kamalakantha et al. | 707/102 |
| 2010/0153482 A1 | 6/2010 | Kim et al. | 709/201 |
| 2010/0161759 A1 | 6/2010 | Brand | |
| 2010/0306524 A1 | 12/2010 | Runkis | |
| 2010/0332818 A1 | 12/2010 | Prahlad | |
| 2011/0125895 A1 * | 5/2011 | Anderson et al. | 709/224 |
| 2011/0238458 A1 * | 9/2011 | Purcell et al. | 705/7.27 |
| 2011/0246294 A1 | 10/2011 | Robb | |
| 2011/0246377 A1 | 10/2011 | Buchhop | |
| 2011/0265164 A1 | 10/2011 | Lucovsky | |
| 2011/0276537 A1 | 11/2011 | Jegerlehner | |
| 2012/0005519 A1 | 1/2012 | Kretschmer | |
| 2012/0110185 A1 | 5/2012 | Ganesan | |
| 2012/0137309 A1 | 5/2012 | Makam et al. | |
| 2012/0158699 A1 | 6/2012 | Creel | |
| 2012/0158821 A1 | 6/2012 | Barros | |
| 2012/0198018 A1 | 8/2012 | Malafeev | |
| 2012/0198036 A1 | 8/2012 | Korovin | |
| 2012/0303698 A1 | 11/2012 | Shkvarchuk | |

FOREIGN PATENT DOCUMENTS

| | | |
|---|---|---|
| CN | 101448265 | 6/2009 |
| CN | 101529966 | 9/2009 |
| CN | 10169727 | 4/2010 |
| CN | 101697274 | 4/2010 |

OTHER PUBLICATIONS

"SaaS Data Replication: Get More from Your Salesforce and On-Premise BI Tools"; Sep. 4, 2009; http://cloudintegration.wordpress.com/tag/data-replication-as-a-service/; 1 pg.

Apte, N.; "Data.Management.Overview"—Pub: Jun. 5, 2009; http://wiki.open-esb.java.net/Wiki.jsp?page=Data.Management.Overview; 4 pgs.

George, B.; "Master Data Management with Dynamics AX and MDS (Future)"; Apr. 21, 2010; http://community.dynamics.com/blogs/brandongeorge/archive/2010/04/21/master-data-management-with-dynamics-ax-and-mds-40-future-41.aspx; 2 pgs.

Graham, T.; "Bringing Master Data Management to the Stakeholders"; Apr. 2010; Microsoft Corporation; 9 pgs.

Graham, T.; "Defining the Role of MDM in the Organization: A Business Perspective"; Apr. 2008; Microsoft Corporation; 10 pgs.

Graham, T.; "Defining the Role of MDM in the Organization: A Technical Perspective"; Apr. 2008; Microsoft Corporation; 14 pgs.

Lawson, Lr.; "Cheaper Master Data Management, Just in Time for the Cloud"—Pub: Sep. 30, 2009; http://www.itbusinessedge.com/cm/blogs/lawson/cheaper-master-data-management-just-in-time-for-the-cloud/?cs=36260; 10 pgs.

Liaison; "Master Data Management"; Retrieved Date: Jul. 28, 2010; http://www.liaison.com/Services/PremierenbspManagednbspServices/MasternbspDatanbspManagement/tabid/58/Default.aspx; 2 pgs.

MSDN; "How to: Add a Reference to a Web Service"; Retrieved Date: Jul. 28, 2010; http://msdn.microsoft.com/en-us/library/bb628649.aspx; 2 pgs.

MSDN; "The What, Why, and How of Master Data Management"; Nov. 2006; Microsoft Corporation; 10 pgs.

Nagy, S.; "Above the Cloud"; Jul. 24, 2010; http://azure.snagy.name/blog/?p=294; 7 pgs.

Oracle; "Enterprise Data Services in SOA Using ODI Suite"; Feb. 2009; http://www.oracle.com/technology/products/oracle-data-integrator/pdf/dataservices.and.odisuite.whitepaper.pdf; 19 pgs.

Oracle; "Master Data Management"; Jun. 2009; http://www.oracle.com/master-data-management/master-data-management-technical-brief.pdf; 45 pgs.

Saran, C.; "Putting ERP in the Cloud"; Apr. 8, 2010; http://www.computerweekly.com/Articles/2010/04/08/240850/putting-erp-in-the-cloud.htm; 4 pgs.

Sun Data; "Sun Master Data Management Suite Primer"—Retrieved Date: Jul. 27, 2010; http://docs.sun.com/app/docs/doc/820-5699/ref_mdm-primer-tools_c?l=en&a=view; 7 pgs.

Sun Microsystems; "SunMaster Data Management Suite Primer"; 2008; http://dlc.sun.com/pdf/820-5699/820-5699.pdf; 48 pgs.

Talend MDM; "Open Source Master Data Management Solution"; Retrieved Date: Jul. 29, 2010; http://www.talend.com/master-data-management/talend-mdm.php; 2 pgs.

Wang, R.; "Thursday's Tech Showcase: SnapLogic Tackles Cloud/SaaS Integration Challenges"—Pub: Apr. 22, 2010; http://www.enterpriseirregulars.com/16845/thursday%E2%80%99s-tech-showcase-snaplogic-tackles-cloudsaas-integration-challenges/; 5 pgs.

Office Action mailed Jan. 11, 2013, issued in U.S. Appl. No. 13/015,462.

Office Action mailed May 15, 2013, issued in U.S. Appl. No. 13/015,453.

Office Action mailed May 31, 2013, issued in U.S. Appl. No. 13/015,462.

Chinese 1st Office Action in Application 2012100191917, mailed Aug. 14, 2014, 11 pgs.

Chinese 1st Office Action in Application 201210019824.4, mailed Jul. 21, 2014, 10 pgs.

Chinese 1st Office Action in Application 201210019836.7, mailed Jan. 24, 2014, 14 pgs.

Chinese 2nd Office Action in Application 201210019836.7, mailed Sep. 16, 2014, pgs.

Office Action mailed Oct. 17, 2013, issued in U.S. Appl. No. 13/015,453.

Office Action mailed Sep. 11, 2013, issued in U.S. Appl. No. 13/015,462.

Philip A. Bernstein et al., "Information Integration in the Enterprise", Communications of the ACM, 51(9):72-79, 2008.

U.S. Appl. No. 13/015,462, Amendment and Response filed Mar. 11, 2014, 11 pgs.

U.S. Appl. No. 13/015,462, Amendment and Response filed Apr. 11, 2013, 8 pgs.

U.S. Appl. No. 13/015,462, Amendment and Response filed Aug. 26, 2013, 9 pgs.

(56) References Cited

OTHER PUBLICATIONS

U.S. Appl. No. 13/015,462, Amendment and Response filed Aug. 28, 2014, 10 pgs.
U.S. Appl. No. 13/015,462, Office Action mailed May 30, 2014, 19 pgs.
U.S. Appl. No. 13/015,453, Amendment and Response filed Mar. 17, 2014, 11 pgs.
U.S. Appl. No. 13/015,453, Amendment and Response filed Aug. 15, 2013, 8 pgs.
U.S. Appl. No. 13/015,453, Amendment and Response filed Jan. 27, 2015, 12 pgs.
U.S. Appl. No. 13/015,453, Office Action mailed Nov. 5, 2014, 19 pgs.
U.S. Appl. No. 13/015,462, Office Action mailed Dec. 18, 2014, 20 pgs.
U.S. Appl. No. 13/015,453, Office Action mailed Apr. 1, 2015, 18 pgs.
U.S. Appl. No. 13/015,462, Amendment and Response filed Mar. 18, 2015, 15 pgs.
Chinese Decision on Rejection in Application 201210019836.7, mailed Mar. 9, 2015, 13 pgs.
Chinese 2nd Office Action in Application 201210019824.4, mailed Mar. 30, 2015, 6 pgs.

\* cited by examiner

CLOUD BASED MASTER DATA MANAGEMENT

BACKGROUND

Many Master Data Management (MDM) services help enterprises standardize the data people rely on to make critical business decisions. Using MDM Services, organizations attempt to manage critical data assets companywide and across diverse systems, in an attempt to enable more people to securely manage master data directly, and to ensure the integrity of information over time. Each enterprise maintains their own MDM service which can be a complex undertaking.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A cloud based service provides Master Data Management (MDM) services to clients. A client may create/modify MDM workflows that are hosted by the cloud based service to assist in meeting their needs. An interface is provided at points within the workflow that is hosted by the cloud based service. The cloud based service utilizes a flexible pipeline that executes predefined configurable blocks. A user can create or customize an existing workflow based on the predefined set of blocks (e.g. execution blocks, conditional blocks, loop blocks). The blocks are configured to receive, process and send information relating to the master data according to a predefined schema. Clients may publish master data changes and/or subscribe to master data changes made by other clients.

DETAILED DESCRIPTION

Figure 1:
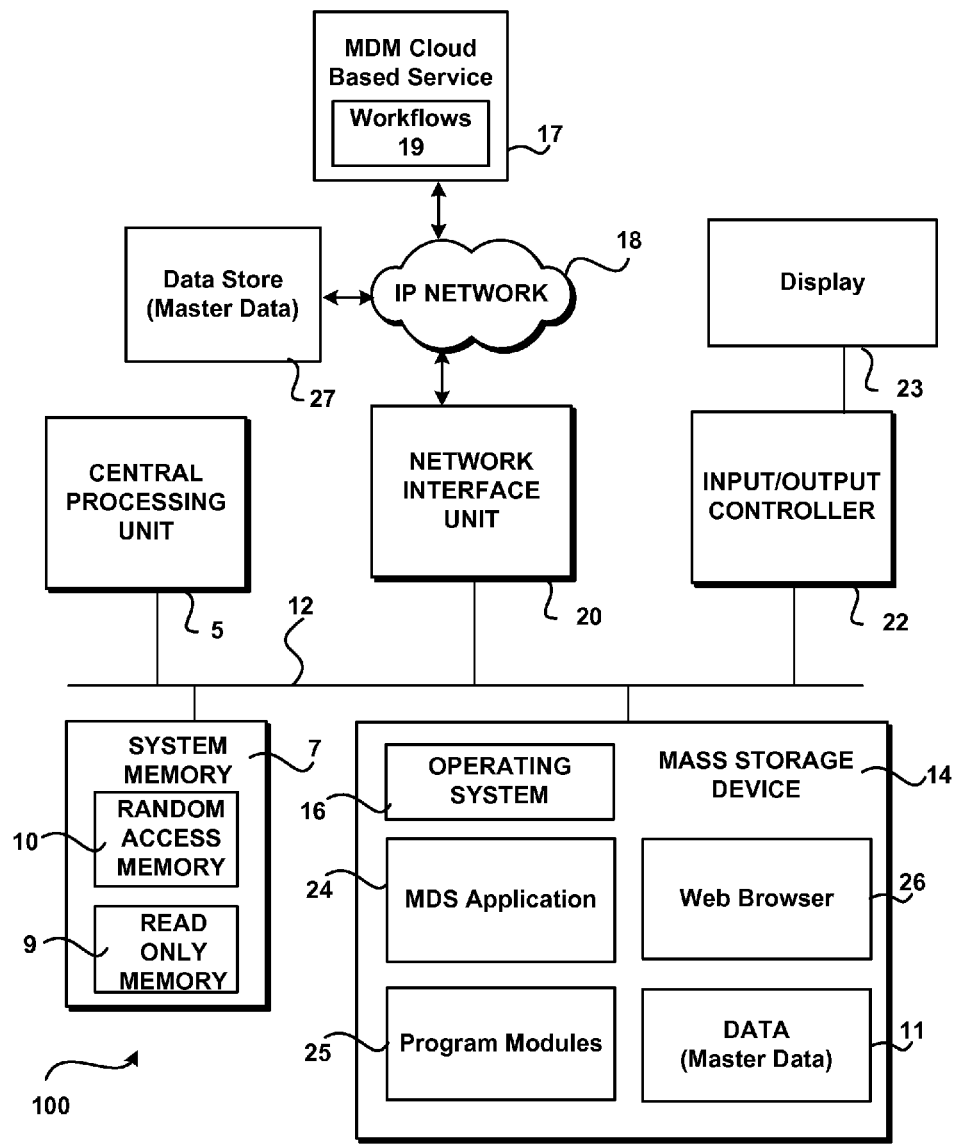
FIG. 1 illustrates an exemplary computing environment.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer environment for a computer 100 utilized in the various embodiments will be described. The computer environment shown in FIG. 1 includes computing devices that each may be configured as a server, a desktop or mobile computer, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, data 11, MDS application 24, Web browser 26, and other program modules 25.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide input/output to an IP phone, a display screen 23, a printer, or other type of input/output device.

As mentioned briefly above, a number of program modules and data files may be stored in the mass storage device 14 and RAM 9 of the computer 100, including an operating system 16 suitable for controlling the operation of a computer, such as the WINDOWS 7® or WINDOWS SERVER® operating system from MICROSOFT CORPORATION of Redmond, Wash. The mass storage device 14 and RAM 9 may also store one or more program modules. In particular, the mass storage device 14 and the RAM 9 may store one or more application programs, including MDS application 24, Web browser 26, and program modules 25. According to an embodiment, the MDS application 24 is a MICROSOFT CORPORATION application. Other ERP/MDS applications that interact with master data may also be used.

Master data may be many types of data. Generally, master data are the critical nouns of a business and fall generally into four groupings: people, things, places, and concepts. Further categorizations within those groupings are called subject areas, domain areas, or entity types. For example, within people, there are customer, employee, and salesperson. Within things, there are product, part, store, and asset. Within concepts, there are things like contract, warrantee, and licenses. Finally, within places, there are office locations and geographic divisions. Some of these domain areas may be further divided. Customer may be further segmented, based on incentives and history. A company may have normal customers, as well as premiere and executive customers. Product may be further segmented by sector and industry. The requirements, life cycle, and CRUD (created, read, updated, deleted, and searched) cycle for a product in the Consumer Packaged Goods (CPG) sector is likely very different from those of the clothing industry. The granularity of domains is essentially determined by the magnitude of differences between the attributes of the entities within them.

Master data can be described by the way that it interacts with other data. For example, in transaction systems, master data is generally involved with transactional data. A customer buys a product. A vendor sells a part, and a partner delivers a crate of materials to a location. An employee is hierarchically related to their manager, who reports up through a manager (another employee). A product may be a part of multiple hierarchies describing their placement within a store. This relationship between master data and transactional data may be fundamentally viewed as a noun/verb relationship. Transactional data capture the verbs, such as sale, delivery, purchase, email, and revocation; master data are the nouns. This is the same relationship data-warehouse facts and dimensions share.

As cardinality (the number of elements in a set) decreases, the likelihood of an element being treated as a master-data element—even a commonly accepted subject area, such as customer—decreases. For example, if a company has only three customers, most likely they would not consider those customers master data—at least, not in the context of supporting them with a master-data management solution, simply because there is no benefit to managing those customers with a master-data infrastructure. Yet, a company with thousands of customers would consider Customer an important subject area, because of the concomitant issues and benefits around managing such a large set of entities. The customer value to each of these companies is the same. Both rely upon their customers for business. One needs a customer master-data solution; the other does not. Cardinality does not change the classification of a given entity type; however, the importance of having a solution for managing an entity type increases as the cardinality of the entity type increases.

Master data tends to be less volatile than transactional data. As it becomes more volatile, it typically is considered more transactional. For example, some might consider "contract" a master-data element. Others might consider it a transaction. Depending on the lifespan of a contract, it can go either way. An agency promoting professional athletes might consider their contracts as master data. Each is different from the other and typically has a lifetime of greater than a year. It may be tempting to simply have one master-data item called "athlete." However, athletes tend to have more than one contract at any given time: one with their teams and others with companies for endorsing products. The agency would need to manage all those contracts over time, as elements of the contract are renegotiated or athletes traded. Other contracts—for example, contracts for detailing cars or painting a house—are more like a transaction. They are one-time, short-lived agreements to provide services for payment and are typically fulfilled and destroyed within hours.

Simple entities, even valuable entities, are rarely a challenge to manage and are rarely considered master-data elements. The less complex an element, the less likely the need to manage change for that element. Typically, such assets are simply collected and tallied. For example, Fort Knox likely would not track information on each individual gold bar stored there, but rather only keep a count of them. The value of each gold bar is substantial, the cardinality high, and the lifespan long; yet, the complexity is low.

The more valuable the data element is to the company, the more likely it will be considered a master data element. Value and complexity work together.

While master data is typically less volatile than transactional data, entities with attributes that do not change at all typically not classified as master data. For example, rare coins would seem to meet many of the criteria for a master-data treatment. A rare-coin collector would likely have many rare coins. So, cardinality is high. They are valuable. They are also complex. For example, rare coins have a history and description. There are attributes, such as condition of obverse, reverse, legend, inscription, rim, and field. There are other attributes, such as designer initials, edge design, layers, and portrait.

Yet, rare coins do not need to be managed as a master-data item, because they don't change over time—or, at least, they don't change enough. There may need to be more information added, as the history of a particular coin is revealed or if certain attributes must be corrected. But, generally speaking, rare coins would not be managed through a master-data management system, because they are not volatile enough to warrant a solution.

One of the drivers of master-data management is reuse. For example, in a simple world, the CRM system would manage everything about a customer and not need to share any information about the customer with other systems. However, in today's complex environments, customer information needs to be shared across multiple applications. That's where the trouble begins. Because—for a number of reasons—access to a master datum is not always available, people start storing master data in various locations, such as spreadsheets and application private stores. There are still reasons, such as data-quality degradation and decay, to manage master data that is not reused across the enterprise. However, if a master-data entity is reused in multiple systems, it's a sure bet that it should be managed with a master-data management system.

While it is simple to enumerate the various master-data entity types, it is sometimes more challenging to decide which data items in a company should be treated as master data. Often, data that does not normally comply with the definition for master data may need to be managed as such, and data that does comply with the definition may not. Ultimately, when deciding on what entity types should be treated as master data, it is better to categorize them in terms of their behavior and attributes within the context of the business needs than to rely on simple lists of entity types.

A client application, such as MDS application 24, or web browser 26, is configured to interact with workflows, such as workflows 19 hosted by MDM service 17 that is used to interact with master data, such as master data 11 and/or master data 27 that is stored in a network data store. Cloud based MDS service 17 may host all/portion of MDM services for a client. For example, a client may integrate a local MDM service with functionality provided by MDM service 17 or manage all of their master data needs using MDM service 17.

A secure connection is created between the client computing device and MDM cloud based service 17. For example, master data services (MDS) client application 24 and/or web browser 26, may be used to interact with master data and workflows 19 that is hosed by MDM service 17. A client, such as client 100, may modify MDM workflows 19 that are hosted by the MDM cloud based service 17 to assist in meeting their needs. The workflows are arranged in a flexible pipeline that executes predefined configurable blocks. A client may connect to MDM cloud based service 17 and can create/customize an existing workflow based on the predefined set of blocks (e.g. execution blocks, conditional blocks, loop blocks). The blocks are configured to receive, process and send information relating to the master data according to a predefined schema. A client may also publish master data that may be consumed by other clients. A client may also subscribe to changes to master data such that the client is notified when master data changes. More description is provided below.

Figure 2:
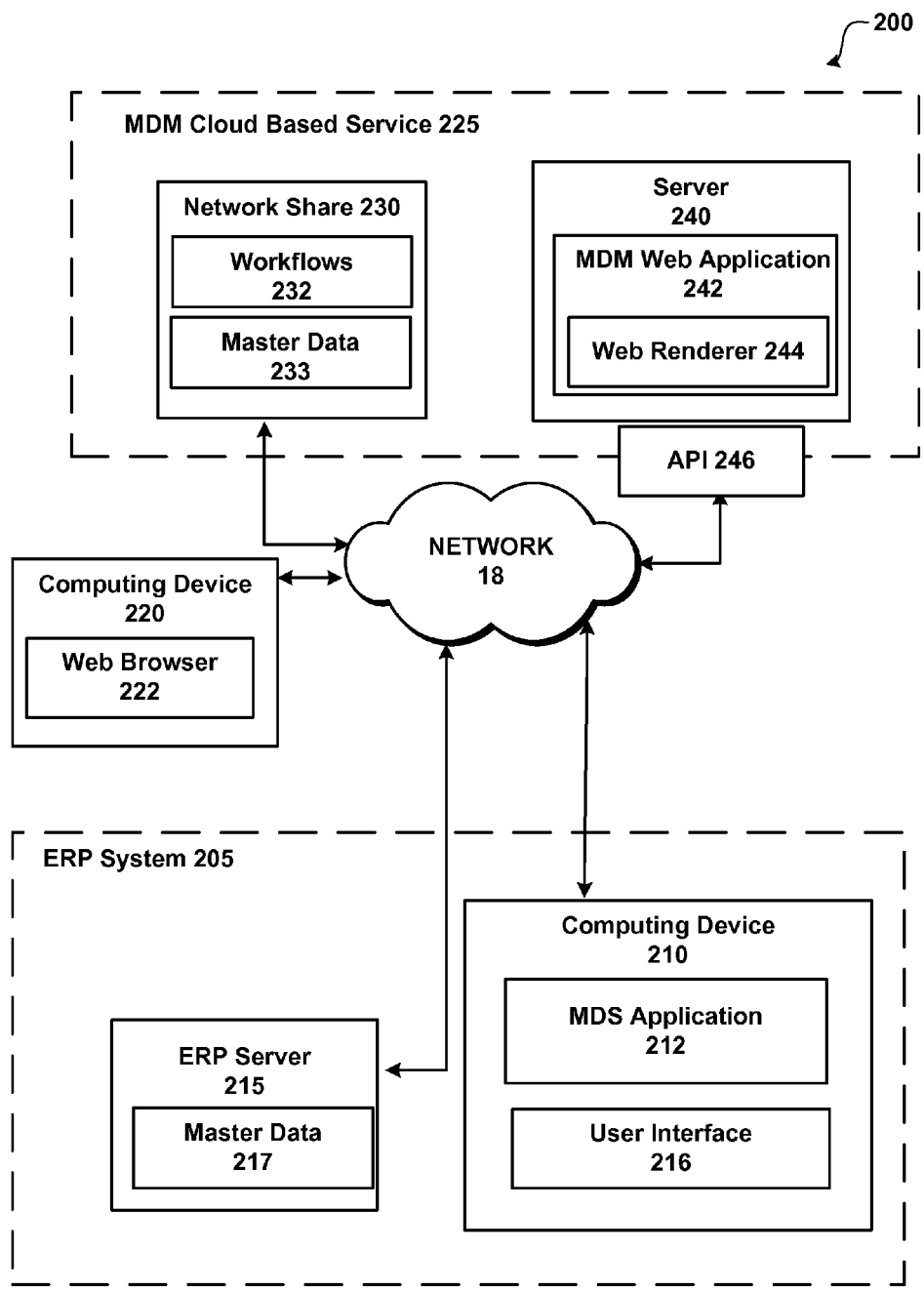
FIG. 2 shows a system for a client interacting with a MDM cloud based network service.

FIG. 2 shows a system for a client interacting with a MDM cloud based network service. As illustrated, system 200 includes ERP system 205, MDM cloud based network service 225 and computing device 220. ERP system comprises computing device 210, and ERP server 215. MDM service 225 comprises network share 230 and server 240. More or less computers may be configured to operate within the system illustrated in FIG. 2.

The computing devices may be configured in different ways. For example, some of the computing devices may be: mobile computing devices (e.g. cellular phones, tablets, smart phones, laptops, and the like); desktop computing devices and servers. MDM service 225 is configured to provide an online cloud based service (e.g. an ERP/MDS service for interacting with master data) that allows clients to interact with workflows 232 that relate to MDM and to publish/subscribe to master data. Some computing devices may be arranged as data shares, some may be arranged in local networks, some may be arranged in networks accessible through the Internet, and the like.

The computing devices are coupled through network 18. Network 18 may be many different types of networks. For example, network 18 may be an IP network, a carrier network for cellular communications, and the like. Generally, network 18 is used to transmit data between computing devices, such as computing device 210, computing device 220, network share 230 and network service 240.

Computing device 210 includes MDS application 212 and user interface 216. As illustrated, computing device 210 is used by a user to interact with master data, such as master data 217 stored within ERP server 215 and master data 233 stored with MDM service 225 in network share 230. Master data may be stored in many different locations. For example, one or more data stores may be used to store master data relating to ERP system 205.

User interface (UI) 216 is used to interact with an application, such as MDS application 212 and MDS web application 242. For example, UI 216 may be used to create/modify a workflow that is hosted by MDM cloud based service 225.

Computing device 220 includes one or more applications, such as web browser 222 that may be configured to view/enter/interact with master data that is published to network service 225. For example, web browser 222 may be used to access a server, such as server 240, within MDM cloud based network service 225 that provides master data services. Computing device 220 may be used to create/modify workflows 232 that are hosted by MDM cloud based service 225.

MDM cloud based service 225 includes server 240 and network share 230. Server 240 comprises MDM web application 242 that comprises web renderer 244. Web application 242 is configured for receiving and responding to requests relating to master data services. For example, server 240 may access master data 233 or other data stored on network share 230. Web application 242 is operative to provide an interface to a user of a computing device, such as a mobile computing device or some other computing device (e.g. computing device 210, computing device 220) to interact with master data/workflows via network 18.

MDM service 225 receives requests from computing devices, such computing device 210 to perform operations relating to master data. For example, the client may make a change to a master data item, create/modify a workflow and/or request information concerning master data. A client application, such as MDS application 212, interacts with the master data and workflows that are hosted by MDM service 225.

As discussed, MDM cloud based service 225 is configured to provide master data management services for clients. The clients may be associated with different organizations and companies. For example, MDM service 225 may be configured to provide MDM services for thousands of different companies. MDM cloud based service 225 may also be used to manage multi-site deployments for an organization. MDM service 225 is directed at providing a configurable out of the box solution for master data management solutions. According to an embodiment, the MDM cloud based service 225 is configured to integrate with different client MDS applications, such as MDS application 212.

Workflows 232 are hosted by the MDM cloud based service 225 to assist a client in meeting their MDM needs. The workflows are arranged in a flexible pipeline that executes predefined configurable blocks. A client may connect to MDM cloud based service 225 from a variety of computing devices/locations and can create/customize an existing MDM workflow based on the predefined set of blocks (e.g. execution blocks, conditional blocks, loop blocks). The blocks are configured to receive, process and send information relating to the master data according to a predefined schema. For example, client computing device 210 may publish master data using MDM cloud based service 225 that is subscribed to by other computing devices/systems.

An application programming interface (API 246) is used by a client to interact with one or more workflows 232. The API is used to interact with the blocks comprising the workflow. The customizable workflows allow a user to provide a centralized workflow that has an input and an output and may transform the data to/from a variety of formats including user-defined formats. For example, one ERP service may use data in a first format whereas another client within the MDM system consumes data in a second formation.

Clients may also subscribe to and publish master data using different applications/versions/systems. MDM cloud based service 225 may be connected to a variety of different systems, as well as being connected to different versions of the master data systems. For example, ERP system 205 may publish/subscribe to master data that is consumable by one or more other parts of the system.

According to an embodiment, the API 246 comprises the following public interfaces:

```
[ServiceContract]

public interface IMdsService
{
    [OperationContract]
    IEnumerable<string> GetAllEndpointsNames( );
    [OperationContract]
    void ConnectToEndpoint(string endpointFullName, string
clientName);
    [OperationContract]
    void CreateEndpoint(string endpointFullName, EndpointType type,
IEnumerable<SchemaMemberDefinition> schemaMembers);
    [OperationContract]
    void CreateEntity(string entityFullName,
IEnumerable<SchemaMemberDefinition> schemaMembers);
    [OperationContract]
    void Associate(string endpointFullName, string entityFullName);
}
                            [ServiceContract]

public interface IMessageEndpoint
{
    [OperationContract]
    void PushMessage(DataMessage message);
    [OperationContract]
    DataMessage GetMessage(string endpointFullName, string
clientName);
    [OperationContract]
    void DeleteMessage(string endpointFullName, string clientName,
Guid messageId, string receipt);
}
                            [ServiceContract]

public interface IWorkflowDesignService
{
    [OperationContract]
    void InsertBlockBefore(BlockMetadataDefinition ancestor,
BlockMetadataDefinition block);
    [OperationContract]
    void InsertBlockAfter(BlockMetadataDefinition predecessor,
BlockMetadataDefinition block);
    [OperationContract]
    void RemoveBlock(BlockMetadataDefinition block);
}
                            [DataContract]

[Serializable]
public class DataField
{
    [DataMember]
    public object NewValue { get; set; }
    [DataMember]
    public object OldValue { get; set; }
}
                            [DataContract]

public class DataMessage
{
    [DataMember]
    public Guid Id { get; set; }
    [DataMember]
    public string EndpointName { get; set; }
    [DataMember]
    public Dictionary<string, DataField> Properties { get; set; }
    [DataMember]
    public string Receipt { get; set; }
}
                            [DataContract]

public class SchemaMemberDefinition
{
    [DataMember]
    public string Name { get; set; }
    [DataMember]
    public SchemaMemberType Type { get; set; }
    [DataMember]
    public uint TypeSize { get; set; }
    [DataMember]
    public bool IsKey { get; set; }
    [DataMember]
```

-continued

```
    public bool IsMandatory { get; set; }
}
                            [DataContract]

public class BlockMetadataDefinition
{
    [DataMember]
    public string Name { get; set; }
    [DataMember]
    public Uri Uri { get; set; }
    [DataMember]
    public BlockKind Kind { get; set; }
    [DataMember]
    public string BlockDefinition { get; set; }
}
                            [DataContract]

public class ConstraintDefinition
{
                            [DataMember]

public string Name { get; set; }
    [DataMember]
    public ConstraintType Type { get; set; }
    [DataMember]
    public List<ConstraintDefinition> Children { get; set; }
}
```

Figure 3:
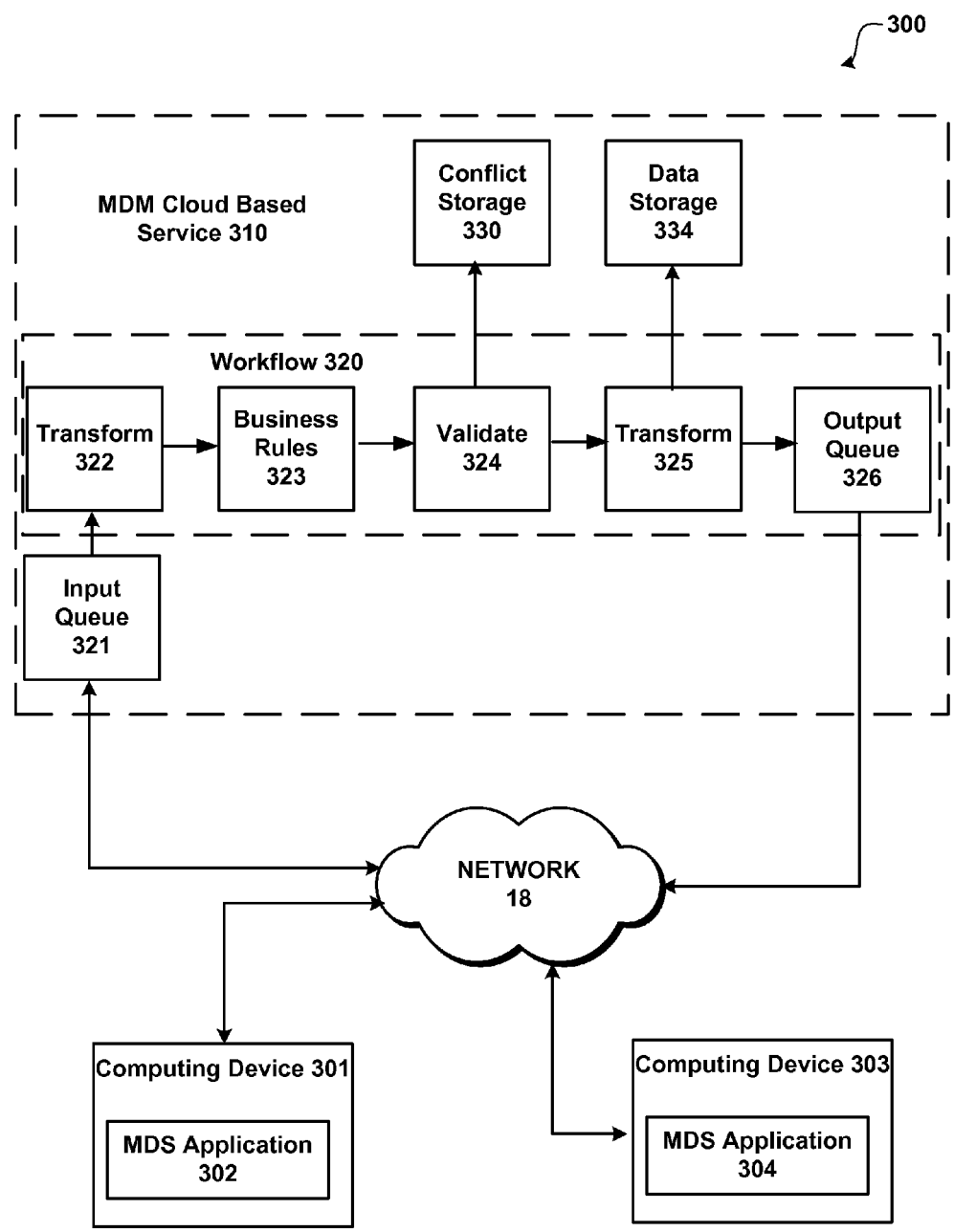
FIG. 3 shows a workflow that is hosted in a cloud based MDM service.

FIG. 3 shows a workflow that is hosted in a cloud based MDM service. As illustrated, system 300 comprises MDM cloud based network service 310, network 18, and computing device 301 and computing device 303. MDM service 310 comprises workflow 320, conflict storage 330, and data storage 334. Computing device 301 and computing device 303 comprise an MDS application (302, 304) used for interacting with and managing master data.

When master data is modified a client, such as computing device 301, workflow 320 transforms the message at block 322, runs business rules at block 323, validates the changes at block 324, transforms the data at block 325, and propagates the data changes to subscribers, such as computing device 303 to help ensure data consistency between the different systems.

The workflows are arranged in a flexible pipeline that executes predefined configurable blocks. A client may connect to MDM cloud based service 310 from a variety of computing devices/locations and can create/customize an existing MDM workflow based on the predefined set of blocks (e.g. execution blocks, conditional blocks, loop blocks). The blocks are configured to receive, process and send information relating to the master data according to a predefined schema.

According to an embodiment, the workflow comprise different types of blocks, including zero or more execution blocks, conditional blocks and loop blocks. Executions blocks comprise any type of action (i.e. business rule or message schema transformation). Conditional blocks include the use of conditional statements that are applied to the workflow (i.e. if/else statements). Loop blocks are used to model loops within a workflow. A client may use an API to create/modify the different blocks. The workflows may relate to an execution service and/or a predicate service. An execution service is a service that can process a message and pass it to the next block in the workflow. A predicate service can return true or false depending on received message and is generally used to customize conditional and loop blocks. According to an embodiment, a default set of predefined models, business rules and workflows may be used by one or more clients.

Figure 4:
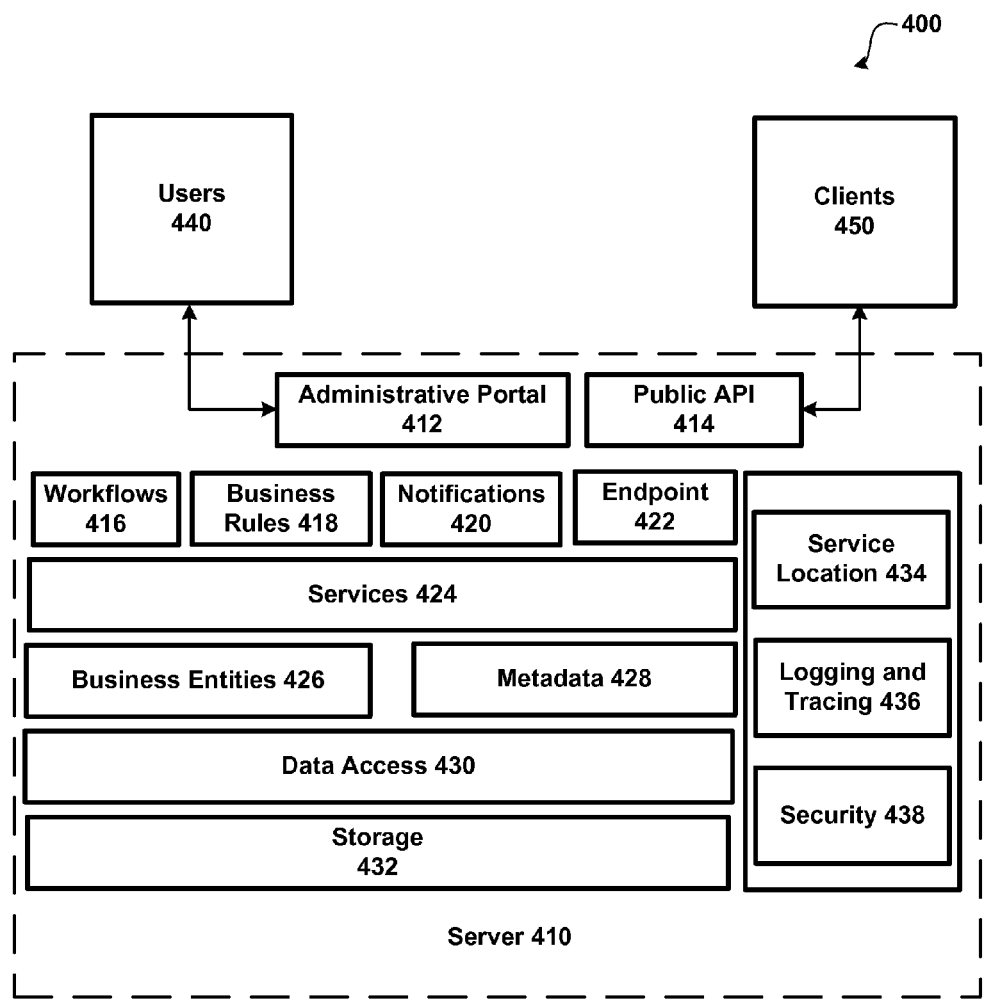
FIG. 4 illustrates a server architecture for a cloud based MDM service.

FIG. 4 illustrates a server architecture for a cloud based MDM service. As illustrated, server architecture 400 comprises server 410 that is coupled to users 440 and clients 450. Server 400 comprises administrative portal 412, public API 414, workflows 416, business rules 418, notifications 420, endpoint 422 services 424, business entities 426, metadata 428, data access 430, storage 432, service location 434, logging and tracing 436 and security 438.

The administration portal 412 allows users to manage their master data using master data like modeling capabilities, CRUD operation, conflicts resolution, and the like. For example, a user may create/modify a workflow. Storage 432 is used to store master data, workflows and other information relating to the management of master data. For example, storage 432 may be used to store tables, queues, and the like. Clients 450 use public API 414 to publish master data, invoke one or more workflows, and/or subscribe to changes to master data.

Figure 5:
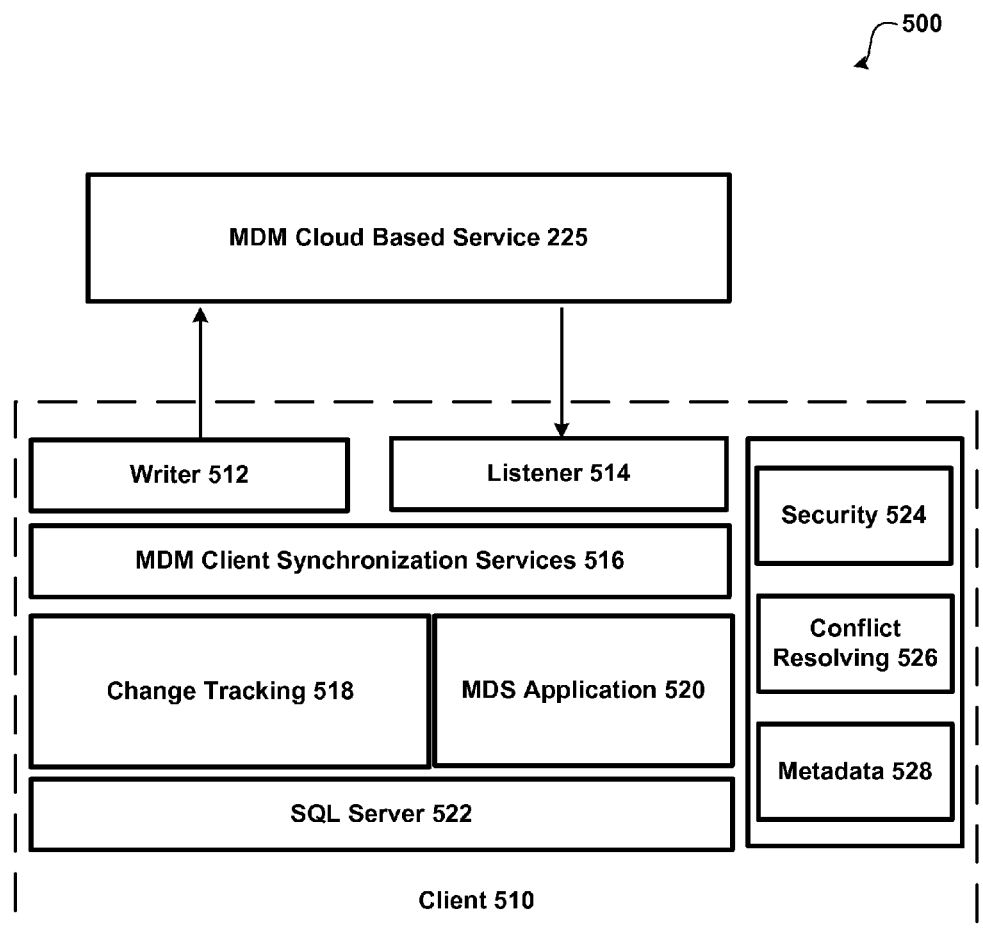
FIG. 5 illustrates a client architecture for accessing a cloud based MDM service.

FIG. 5 illustrates a client architecture for accessing a cloud based MDM service. As illustrated, client architecture 500 includes client 510 that comprises writer 512, listener 514, MDM client synchronization services 516, change tracking 518, MDS application 520, SQL server 522, security 524, conflict resolving 526 and metadata 528. Writer 512 is used to send a message relating to master data to MDM cloud based service 225. For example, client 510 may make a change to master data that is subject to the processing of a workflow that is hosted by MDM service 225. Listener 514 listens for notifications from MDM cloud based service 225 that relate to changes to master data. For example, when a master data item changes to which client 510 has subscribed, MDM service 225 sends a message to client 510 indicating/supplying the change to the master data. MDM client synchronization services 516 detects when changes are made to master data and submits the changes to MDM service 225 when needed and/or incorporates the changes to the master data 510 that were made by another client. Change tracking 518 is configured to detect when changes are made to master data. The change tracking assists in propagating local changes to the master data to the cloud based MDM service 225. MDS application 520 may be used to interact with master data that is local to client and/or non-local (e.g. MDM cloud based service 225). According to an embodiment, the change tracking is built based on functionality provided by SQL server 522. On the client side we provide the set of generic services to connect and synchronize master data cross different business applications. Security 524 is used to set security settings relating to master data. Conflict resolving 526 is configured to perform operations relating to conflicts relating to master data. Metadata 528 may be various types of data relating to the management of master data.

Figure 6:
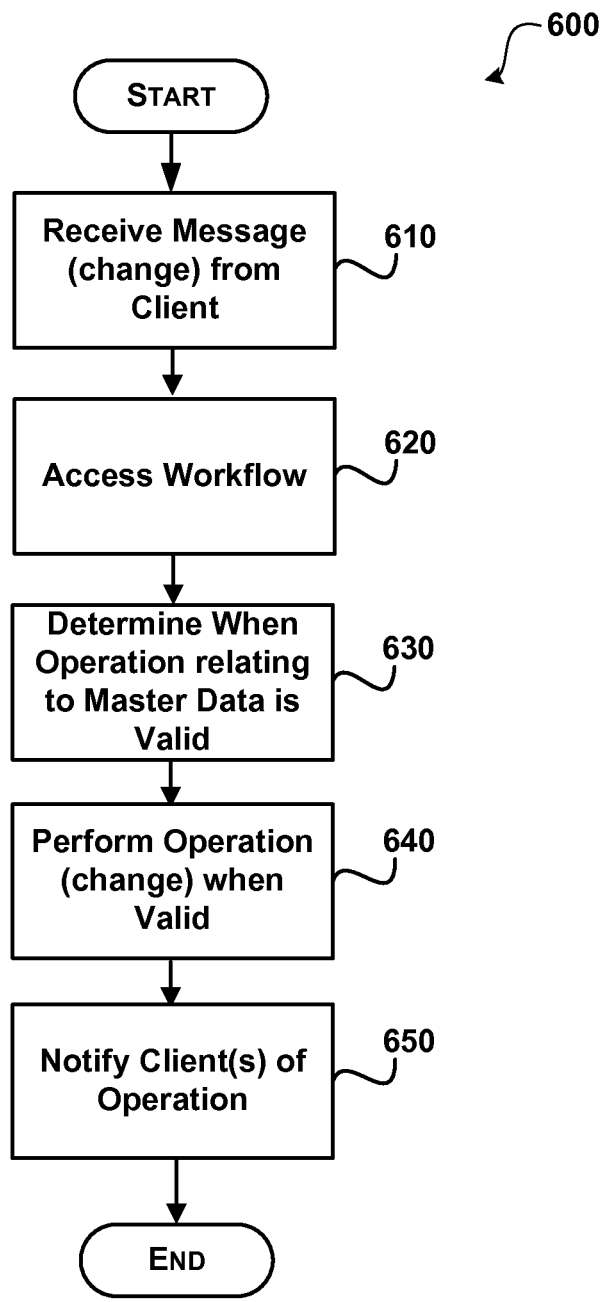
FIG. 6 shows an illustrative process for cloud based Master Data Management.

Referring now to FIG. 6 an illustrative process for cloud based Master Data Management will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start block, process 600 moves to operation 610, where a message is received from a client that is related to master data management. The message includes a desired operation to perform using the MDM cloud based service. The operation may be a change to master data and/or a change to a workflow and/or a subscribe request. For example, a user may send a proposed change to master data to the cloud based MDM service. A user may also create/modify a workflow using the API. A user may also request to subscribe to one or more master data items.

Moving to operation 620, the workflow relating to the operation in the message is accessed. For example, each client may have its own workflow. A client may also be associated with more than one workflow. The message may include an identifier that is used to access the workflow. The MDM service may also store information relating to what workflow(s) to access in response to receiving a message from a client.

Flowing to operation 630, a determination is made as to when the operation is valid. For example, a proposed change to master data may be subject to different restrictions before the change is determined to be valid. Similarly, a change to a workflow may have restrictions to satisfy.

Transitioning to operation 640, the operation relating to the message is performed when determined to be valid. For example, a change to a master data item may be stored, a change to a workflow may be stored, a subscription request may be stored, and the like.

Moving to operation 650, the client(s) are notified of the performed operation. For example, one or more clients that are subscribed to receive notifications of when the master data item is changed may be notified. A confirmation notification may be sent to a user in response to a successful change to the workflow and/or subscription request.

The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing master data, comprising:
receiving a first message from a first client by a server that is part of a cloud based Master Data Management (MDM) service that is used to manage master data including changes to the master data for a plurality of clients, wherein the first message includes a first operation to be performed that relates to management of master data that is managed by the cloud based MDM service;
determining that the first operation to be performed in the first message received from the first client is associated with a first workflow based on the first operation in the first message identifying the first workflow;
receiving a second message from a second client by the server, wherein the second message includes a second operation to be performed that relates to the management of master data that is managed by the cloud based MDM service;
determining that the second operation in the second message is associated with a second workflow based on the second message identifying the second workflow;
accessing, via the MDM service, the first workflow associated with the first client, wherein the first workflow is a sequence of blocks that perform actions for managing master data;
determining whether the first operation to be performed in the first message is valid;

when the first operation to be performed in the first message is valid, performing the first operation; and providing a notification when the first operation is performed.

2. The method of claim 1, wherein the first operation is a change to a master data item.

3. The method of claim 1, wherein the first operation is a modification to the first workflow.

4. The method of claim 1, further comprising providing an Application Programming Interface (API) that is used by the client to interact with the MDM service.

5. The method of claim 4, wherein the API provides a public interface for subscribing to a change relating to the master data item and sending the change relating to the master data item.

6. The method of claim 4, wherein the API provides a public interface for modifying a block of the first workflow.

7. The method of claim 1, wherein the API allows the client to set a constraint that is associated with the first workflow that is contained within the network service.

8. The method of claim 1, wherein the blocks consist of an execution block, a conditional block, and a loop block.

9. The method of claim 1, wherein the first workflow in the MDM service transforms the master data item to different formats before providing the notification.

10. The method of claim 1, wherein the MDM service provides a default set of workflows.

11. A computer-readable storage memory device, excluding a signal, storing computer-executable instructions for managing master data, comprising:
receiving a first message from a first device by a cloud based Master Data Management (MDM) service that is used to manage master data including changes to the master data for different a plurality of clients, wherein the first message includes a first desired operation to be performed that relates to management of master data that is managed by the cloud based MDM service;
determining that the first operation to be performed in the first message received from the first device is associated with a first workflow based on the first operation in the first message identifying the first workflow;
receiving a second message from a second device by the MDM service, wherein the second message includes a second operation to be performed that relates to the management of master data that is managed by the cloud based MDM service;
determining that the second operation in the second message is associated with a second workflow based on second message identifying the second workflow;
accessing the first workflow associated with the first device, wherein the desired operation in the message identifies the workflow on which the desired operation is to be performed, and wherein the first workflow is a sequence of blocks that perform actions for managing master data;
determining whether the first desired operation to be performed in the first message is valid;
when the first desired operation to be performed in the first message is valid, performing the first desired operation;
providing a first notification when the first desired operation is performed£
accessing the second workflow associated with the second device, wherein the second workflow is a sequence of blocks that perform actions for managing master data;
determining whether the second operation to be performed in the second message is valid;
when the second operation to be performed in the second message is valid, performing the second operation; and
providing a second notification when the second operation is performed.

12. The computer-readable storage memory device of claim 11, wherein the first operation is at least one of: a change to a master data item; and a modification to the first workflow; and wherein the second operation is at least one of: a change to a master data item; and a modification to the second workflow.

13. The computer-readable storage memory device of claim 11, further comprising providing an Application Programming Interface (API) that is used to interact with the MDM service.

14. The computer-readable storage memory device of claim 13, wherein the API provides a public interface for subscribing to changes relating to master data; sending changes relating to master data; and modifying a block of at least the first workflow and the second workflow.

15. The computer-readable storage memory device of claim 11, wherein the API is used to set a constraint that is associated with at least one of the first workflow and the second workflow.

16. The computer-readable storage memory device of claim 11, wherein the blocks of the first and second workflow consist of an execution block, a conditional block, and a loop block.

17. A system for managing master data, comprising:
a network connection that is configured to connect to a network;
a processor, memory, and a computer-readable storage medium;
an operating environment stored on the computer-readable storage medium and executing on the processor;
a first and second client application for interacting with master data; and
a cloud based Master Data Management (MDM) service that is configured to perform actions, comprising:
manage master data including changes to the master data for a plurality of clients;
receive a first message from the first client application that includes a first operation to be performed that relates to management of master data that is managed by the cloud based MDM service;
determine that the first operation to be performed in the first message received from the first client application is associated with a first workflow based on the first operation in the first message identifying the first workflow;
receive a second message from the second client application, wherein the second message includes a second operation to be performed that relates to the management of master data that is managed by the cloud based MDM service;
determine that the second operation in the second message is associated with a second workflow based on second message identifying the second workflow;
access the first workflow associated with the first client, wherein the first workflow is a sequence of blocks that perform actions for managing master data;
determine whether the first operation to be performed is valid;
when the first operation to be performed is valid, perform the first operation; and
provide a notification when the first operation is performed.

18. The system of claim 17, wherein the first operation is at least one of: a change to a master data item; and a modification to the first workflow.

19. The system of claim 17, further comprising providing an Application Programming Interface (API) that is used to interact with the MDM service.

20. The system of claim 19, wherein the API provides a public interface for subscribing to changes relating to master data; sending changes relating to master data; and modifying a block of the first workflow.

* * * * *